United States Patent
Bates et al.

[19]

[11] Patent Number: 5,999,705
[45] Date of Patent: Dec. 7, 1999

[54] METHOD OF INTERLACED PRINTING USING AN INK JET PRINTER

[75] Inventors: John Booth Bates; Scott Michael Heydinger; Robert Frederick Locasto, all of Lexington, Ky.

[73] Assignee: Lexmark International, Inc., Lexington, Ky.

[21] Appl. No.: 09/060,804

[22] Filed: Apr. 15, 1998

[51] Int. Cl.[6] .................................................. G06K 15/00
[52] U.S. Cl. .......................................... 395/109; 395/116
[58] Field of Search ..................................... 395/101, 109, 395/117, 112, 113, 116; 358/518, 529, 530, 534, 535, 536, 538, 298, 523–524; 382/275

[56] References Cited

U.S. PATENT DOCUMENTS

| | | | |
|---|---|---|---|
| 4,701,811 | 10/1987 | Moriguchi et al. ...................... | 358/298 |
| 4,967,203 | 10/1990 | Doan et al. .............................. | 346/1.1 |
| 5,028,991 | 7/1991 | Sekizawa et al. ....................... | 358/538 |
| 5,300,950 | 4/1994 | Lopez et al. ............................. | 346/1.1 |
| 5,384,587 | 1/1995 | Takagi et al. ............................ | 347/41 |
| 5,455,610 | 10/1995 | Harrington ............................... | 347/43 |
| 5,500,661 | 3/1996 | Matsubara et al. ...................... | 347/41 |
| 5,506,609 | 4/1996 | Claassen et al. ......................... | 347/43 |
| 5,539,433 | 7/1996 | Kawai et al. ............................. | 346/141 |
| 5,625,389 | 4/1997 | Eriksen et al. ........................... | 347/41 |
| 5,625,391 | 4/1997 | Hirabayashi et al. ................... | 347/41 |
| 5,633,663 | 5/1997 | Matsubara et al. ...................... | 347/41 |
| 5,692,108 | 11/1997 | Donahue .................................. | 395/108 |

*Primary Examiner*—Arthur G. Evans
*Attorney, Agent, or Firm*—Todd T. Taylor; John J. McArdle, Jr.

[57] ABSTRACT

A method of printing on a print medium with an ink jet printer uses a first color ink, a second color ink and a black ink. An image area on the print medium has a plurality of pixel locations. Print image data indicate one of a presence and an absence of the first color ink, the second color ink and the black ink at the plurality of pixel locations. A subset of the print image data is defined. A determination is made as to whether the subset of print image data indicates 1) a presence of the first color ink and/or the second color ink within the subset and a presence of the black ink within the subset; 2) a presence of each of the first color ink and the second color ink within the subset at a same corresponding pixel location; and/or 3) a presence of the first color ink and/or the second color ink within the subset at a number of corresponding pixel locations exceeding a threshold value. The print medium is printed on in the image area at an interlace level which is dependent upon the determination.

24 Claims, 1 Drawing Sheet

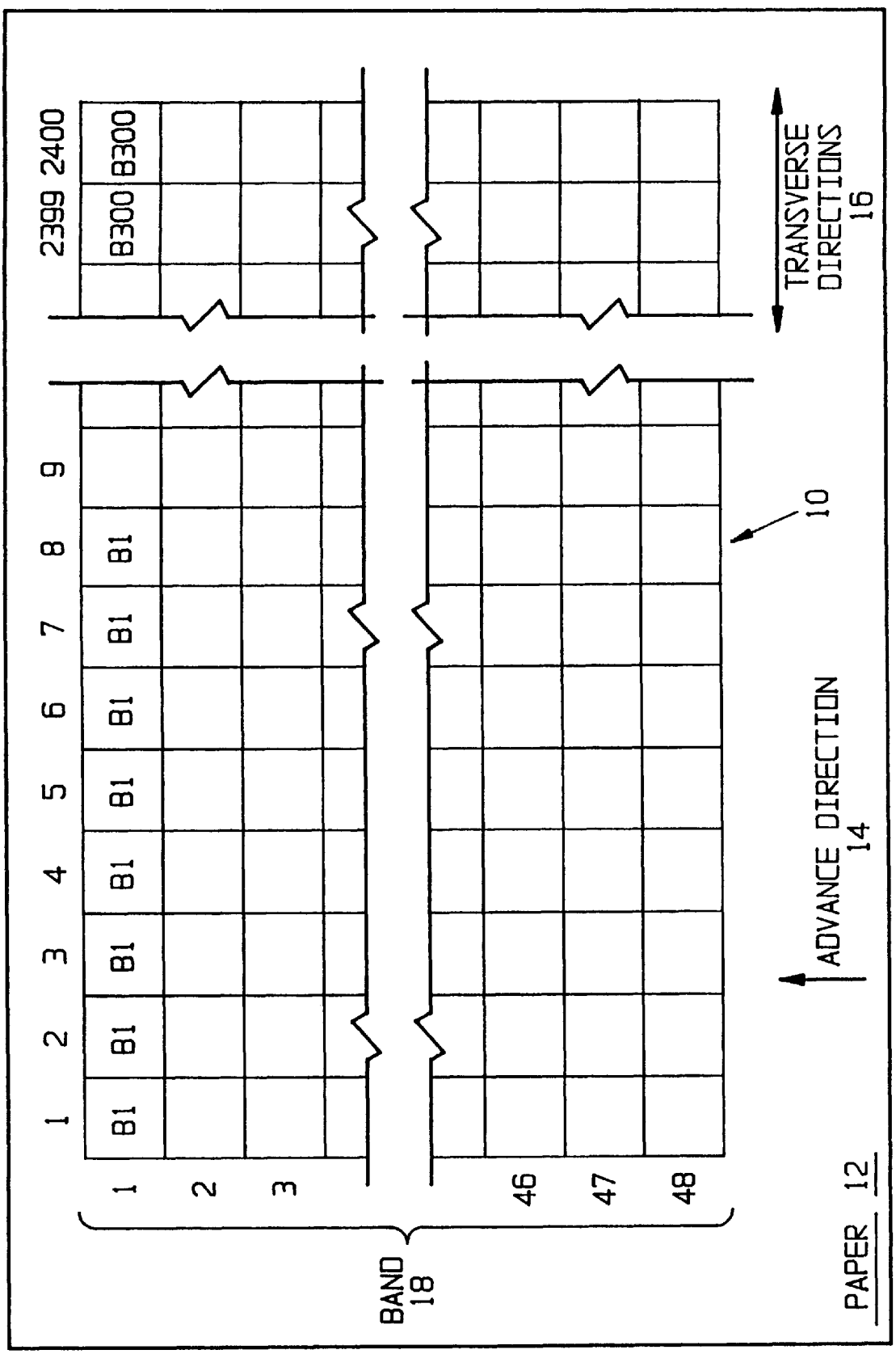

METHOD OF INTERLACED PRINTING USING AN INK JET PRINTER

BACKGROUND OF THE INVENTION

1. Field of the Invention

The present invention relates to ink jet printers, and, more particularly, to a method of interlaced printing using an ink jet printer.

2. Description of the Related Art

Ink jet printers commonly include a printhead which is mounted on a carriage assembly. The carriage assembly is movable in a transverse direction, relative to an advance direction of a print medium such as paper. As the printhead is moved across the print medium during a particular pass of the carriage assembly, ink is selectively jetted from ink jetting orifices formed in the printhead and is deposited on the print medium at corresponding ink dot placement locations in the image area of the print medium. Since the printhead moves in a direction transverse (e.g., perpendicular) to the advance direction of the print medium, each ink jetting orifice passes in a linear manner over the print medium. The line associated with each ink jetting orifice which overlies the print medium is commonly referred to as a raster or raster line. A plurality of rasters which extend across the image area of the print medium are disposed vertically adjacent to each other in the advance direction of the print medium.

Multi-color ink jet printers typically include a printhead having a plurality of ink jetting orifices therein. The ink jetting orifices are segregated into different arrays of ink jetting orifices, with each array corresponding to the different color inks which are to be jetted onto the print medium. With a known tri-color printhead, a first array of inkjetting orifices is used for jetting yellow ink onto the print medium, a second array of ink jetting orifices is used for jetting magenta ink onto the print medium, and a third array of ink jetting orifices is used for jetting cyan ink onto the print medium. The first, second and third arrays of ink jetting orifices are sequentially arranged relative to the advance direction of the print medium. Associated with each ink jetting orifice in the three arrays of ink jetting orifices is a corresponding ink jetting heater. Actuation of a particular ink jetting heater causes the formation of a bubble within the ink disposed adjacent thereto and expels the ink from the associated ink jetting orifice. A host computer connected with the printer transmits raster information to the printer for selective actuation of the ink jetting heaters.

To render a full color image, the tri-color printhead is passed across a print medium such as paper in a horizontal direction perpendicular to the vertical direction of alignment of the orifices in the printhead. Between passes of the printhead, the print medium is moved in the advance direction. For a raster, or row of printed dots, which contains at least one of each of cyan, magenta and yellow dots, the color printhead must be passed at least three times, once passing to deposit any cyan dots present in the given raster, once passing to deposit any magenta dots, and once passing to deposit any yellow dots. Of course, for any pass of the color head all 48 color orifices can be used, depositing the cyan, magenta, and yellow inks at different raster locations. The most time efficient technique for depositing ink therefore causes the tri-color printhead to pass across each raster of the page at most three times.

With a conventional method of printing with a tri-color ink jet printer as described above, objectionable print artifacts may occur because of the sequencing and/or timing between the placement of the different color ink dots on the print medium. For example, print artifacts such as horizontal color/black banding or intercolor bleeding may occur.

One known solution to the problem of a color/black banding artifact is known as shingling or interlaced printing. For a 50% shingling mode (i.e., 2-pass or 50% interlace level), approximately 50% of the dots are placed on any given pass of the printhead. The candidate dots are selected according to a checkerboard pattern. The remaining 50% of the dots are placed on a subsequent pass of the printhead. For a raster which contains cyan, magenta, yellow, and black dots, the color printhead must be passed at least six times with a 50% shingling mode, twice depositing any cyan dots present in the given raster, twice depositing any magenta dots, and twice depositing any yellow dots.

When printing with an ink jet printer using a shingling method as described above, it is known to assign a particular interlace level to the tri-color printhead for use during printing on the print medium. For example assuming that an image area corresponds to 16 rasters, it is known to assign a single interlace level for each of the cyan array of ink jetting orifices, magenta array of ink jetting orifices and yellow array of ink jetting orifices. It is also known to change the interlace level between portions of the image area which are spaced apart in the advanced direction of the print medium. Finally, when using an ink jet printer having both a tri-color printhead and a black printhead, it is known to print using one interlace level for the tri-color printhead and a different or no interlace level for the black printhead.

A selected one of a plurality of interlace levels may be used to effectively reduce a print artifact in a particular portion of an image area. For example, a 50% shingling technique (2 pass shingling) may be used to reduce a print artifact in one portion of the image area, while a 33% shingling technique (3 pass shingling) may be used to reduce a print artifact in a different part of the image area. Conventional methods of shingling would thus select the more restrictive 33% interlace level (3 pass shingling) for both portions of the image area so that all print artifacts are reduced. This may not be optimum from an efficiency stand point in terms of throughput of the printer.

What is needed in the art is a method of printing using a shingling technique which is more adaptable to using different interlace levels for different parts of the image area by dynamically determining interlace levels to be used during printing for different parts of the image area.

SUMMARY OF THE INVENTION

The present invention provides a method of interlaced printing using an ink jet printer, wherein the interlace level to be used during printing is determined dynamically by examining print image data for each ink and a relatively small part of the image area using a discrete set of simple equations.

The invention comprises, in one form thereof, a method of printing on a print medium with an ink jet printer using a first color ink, a second color ink and a black ink. An image area on the print medium has a plurality of pixel locations. Print image data indicate one of a presence and an absence of the first color ink, the second color ink and the black ink at the plurality of pixel locations. A subset of the print image data is defined. A determination is made as to whether the subset of print image data indicates 1) a presence of the first color ink and/or the second color ink within the subset and a presence of the black ink within the subset; 2) a presence of each of the first color ink and the second color ink within the subset at a same corresponding pixel location; and/or 3) a presence of the first color ink and/or the second color ink within the subset at a number of corresponding pixel locations exceeding a threshold value. The print medium is printed on in the image area at an interlace level which is dependent upon the determination.

An advantage of the present invention is that the interlace level for each ink to be used in different parts of an image area can be determined dynamically.

Another advantage is that the different interlace levels to be used can be determined quickly using a simple set of equations.

Yet another advantage is that different equations are used to test for different types of conditions which may cause the formation of print artifacts.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawing, which illustrates a portion of image area overlying a print medium. The exemplification set out herein illustrates one preferred embodiment of the invention, in one form, and such exemplification is not to be construed as limiting the scope of the invention in any manner.

DETAILED DESCRIPTION OF THE INVENTION

Referring now to the drawing, the method of printing of the present invention will be described in greater detail. The method of printing is carried out using an ink jet printer (not shown) which jets, e.g., a first color ink, a second color ink, a third color ink and a black ink onto a print medium. The first color ink may correspond, e.g., to a cyan ink; the second color ink may correspond, e.g., to a magenta ink; and the third color ink may correspond, e.g., to a yellow ink. The black ink may be a true black ink. The first color ink, second color ink and third color ink may be jetted from respective printheads each having a height corresponding to forty-eight ink jetting orifices which effectively are immediately adjacent to each other in the advance direction of the print medium. Alternatively, the different color inks may be jetted from a single printhead with separate arrays of ink jetting orifices.

The drawing illustrates a portion of an image area 10 which overlies a print medium, such as paper 12. Image area 10 includes a plurality of rows of pixels which are disposed adjacent to each other in the advance direction 14 of paper 12. Each of the plurality of rows of pixels, referenced rows 1–48 in the drawing corresponding to the height of a printhead, extends across paper 12 in a transverse direction 16. In the embodiment shown, image area 10 is assumed to have a width in transverse direction 16 of eight inches. Thus, assuming an ink jet printer with a printing resolution of 300 dots per inch (DPI), the number of pixels in the transverse direction is equal to:

8 inches×300 dots=2400 dots or pixels.

inch

The forty-eight rows of pixels also represent the full scan height of one of the printheads (i.e., without interlaced printing). The full scan height of forty-eight rows of pixels is also defined as a band 18 of the rows of pixels. Of course, the actual size of image area 10 in advance direction 14 may be larger than the size of band 18 in advance direction 14.

Print image data (which may be provided from a host computer in the case of a host based printer) indicates a presence or absence of the first color ink, second color ink, third color ink and black ink at the plurality of pixel locations shown within image area 10. That is, for each pixel location within image area 10, separate print image data indicates whether a cyan ink drop is to be placed in the pixel, a magenta ink drop is to be placed within the pixel, a yellow ink drop is to be placed within the pixel and/or a black ink drop is to be placed within the pixel. The print image data may be, e.g., bit image data where the position and value of a particular bit indicate whether or not a particular color ink drop is to be placed at a corresponding pixel location.

The print image data is divided into a plurality of defined subsets of print image data which are individually examined to determine a tendency to cause the formation of a print artifact. In the embodiment shown in the drawing, as described above, image area 10 is divided into forty-eight rows of pixels and 2400 columns of pixels. The subset of print image data is selected as corresponding to 8 bits or one byte of print image data. For each color plane, assuming that the print image data is bit image data, the 8 bits of each byte thus represent whether a particular color ink dot is to be placed at a specific pixel location. For example, a first byte B1 of print image data in the subset indicates whether a particular color ink is to be placed within a corresponding pixel location in row 1, columns 1–8 of image area 10. Again assuming that image area 10 is 8 inches wide, the number of bytes or subsets of print image data for a single color plane is equal to:

$$\frac{1 \text{ byte}}{8 \text{ bits}} \times \frac{1 \text{ bit}}{1 \text{ dot}} \times \frac{300 \text{ dots}}{\text{inch}} \times \frac{8 \text{ inch}}{\text{row}} = \frac{300 \text{ bytes}}{\text{row}}$$

Moreover, assuming image area 10 has a height of forty-eight rows of pixels, the total number of bytes or subsets of print image data which are required to indicate the presence or absence of a particular color ink within all of the pixel locations of image area 10 is equal to:

$$300 \frac{\text{bytes}}{\text{row}} \times 48 \text{ rows} = 14400 \text{ bytes.}$$

Of course, the same number of bytes of print image data must also be provided to indicate the presence or absence of the second color ink, third color ink and black ink at the pixel locations within image area 10.

In the embodiment shown, the subset of print image data is selected as 8 bits or one byte of print image data. However, it will also be appreciated that a different amount of print image data may be defined as a subset of the print image data. For example, the subset of print image data may be selected as corresponding to a 16 bit word of print image data.

Each subset or byte of print image data is examined to determine if the subset indicates a propensity for the formation of a print artifact on paper 12 during printing. In particular, each subset of print image data is examined to determine the presence of one of three different conditions. The first condition determines whether the presence of the first color ink, the second color ink or the third color ink within the subset of print image data, and the presence of the black ink within the subset of print image data. If any of the three bytes of data for the three different color inks includes at least one bit with a value of "1", and the byte of print image data for the black ink includes at least one bit with a value of "1", then a determination is made that a print artifact may occur and printing is carried out at a desired interlace level.

Expressed mathematically, the determination of the first condition may be represented by the equation:

$$R=(C|M|Y)\&\&K$$

where:
C=a presence of cyan ink within the subset of image data at corresponding pixel locations;
M=a presence of magenta ink within the subset of image data at corresponding pixel locations;
Y=a presence of yellow ink within the subset of image data at corresponding pixel locations;
K=a presence of black ink within the subset of image data at corresponding pixel locations; and
R=a metric variable.

The second condition determines whether at least two of the three different color inks are used in very close proximity to each other or at the same pixel location. For the second condition, a determination is made as to whether any two of the three different color inks are to be placed at a same pixel location. That is, if the subset of print image data indicates that the cyan and magenta inks are to be placed at a same pixel location, or that the magenta and yellow inks are to be placed at the same pixel location, or that the cyan and yellow inks are to be placed at the same pixel location, then a determination is made that a print artifact may occur and printing is carried out using a desired interlace level.

The determination of the second condition may be represented by the equation:

$$R=(C\&M)\|(M\&Y)\|(C\&Y)$$

where:
C=a presence of cyan ink within the subset of image data at corresponding pixel locations;
M=a presence of magenta ink within the subset of image data at corresponding pixel locations;
Y=a presence of yellow ink within the subset of image data at corresponding pixel locations;
K=a presence of black ink within the subset of image data at corresponding pixel locations; and
R=a metric variable.

The determination of the third condition is made by examining the subset of print image data to determine the presence of the first color ink, the second color ink and/or the third color ink at a number of corresponding pixel locations which exceeds a threshold value.

More particularly, the particular byte of print image data for the first color ink is examined. If the number of bits in the byte of data with a value of "1" exceeds a threshold value (e.g., 4) then a determination is made that a print artifact may occur and printing is carried out using a desired interlace level. All three of the bytes of data for the first color ink, second color ink and third color ink are examined, and if any of the bytes includes a number of bits with a value of "1" which exceeds the threshold value, then printing is carried out at a desired interlace level.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of printing on a print medium with an ink jet printer using a first color ink, a second color ink and a black ink, said method comprising the steps of:

defining an image area on the print medium having a plurality of pixel locations;

providing print image data indicating one of a presence and an absence of the first color ink, the second color ink and the black ink at said plurality of pixel locations;

defining a subset of said print image data;

determining if said subset of said print image data indicates at least one of:
a presence of at least one of the first color ink and the second color ink within said subset and a presence of the black ink within said subset;
a presence of each of the first color ink and the second color ink within said subset at a same corresponding pixel location; and
a presence of at least one of the first color ink and the second color ink within said subset at a number of corresponding pixel locations exceeding a threshold value; and printing on the print medium in said image area at an interlace level which is dependent upon said determining step.

2. The method of printing of claim 1, wherein said image area includes a plurality of rows of pixels, said plurality of rows being adjacent to each other in an advance direction of the print medium and extending across the print medium in a transverse direction, and comprising the further step of subdividing said image area into a plurality of adjacent bands of said rows of pixels.

3. The method of printing of claim 2, wherein said subset of print image data corresponds to pixel locations within one of said bands.

4. The method of printing of claim 3, wherein said subset of print image data corresponds to pixel locations within one of said rows within said one band.

5. The method of printing of claim 4, wherein said subset of print image data corresponds to pixel locations which are adjacent to each other in the transverse direction within said one row.

6. The method of printing of claim 5, wherein said subset of print image data comprises one of an 8-bit byte and a 16-bit word.

7. The method of printing of claim 6, wherein said print image data comprises bit image data.

8. The method of printing of claim 1, wherein said presence of the first color ink and the second color ink within said subset at a same corresponding pixel location and said presence of the black ink within said subset is determined by the equation:

$$R=(C|M|Y)\&\&K$$

where:

C=a presence of cyan ink within said subset of image data at corresponding said pixel locations;

M=a presence of magenta ink within said subset of image data at corresponding said pixel locations;

Y=a presence of yellow ink within said subset of image data at corresponding said pixel locations;

K=a presence of black ink within said subset of image data at corresponding said pixel locations; and R=a metric variable.

9. The method of printing of claim 1, wherein said presence of each of the first color ink and the second color ink within said subset at a same corresponding pixel location is determined by the equation:

$$R=(C\&M)\|(M\&Y)\|(C\&Y)$$

where:

C=a presence of cyan ink within said subset of image data at corresponding said pixel locations;

M=a presence of magenta ink within said subset of image data at corresponding said pixel locations;

Y=a presence of yellow ink within said subset of image data at corresponding said pixel locations;

K=a presence of black ink within said subset of image data at corresponding said pixel locations; and R=a metric variable.

10. The method of printing of claim 1, wherein said subset of print image data comprises one of an 8-bit byte and a 16-bit word.

11. The method of printing of claim 10, wherein said subset of print image data comprises an 8-bit byte.

12. The method of printing of claim 10, wherein said print image data comprises bit image data.

13. The method of printing of claim 1, wherein the first color ink comprises one of cyan ink, magenta ink and yellow ink, and the second color ink comprises another of said cyan ink, magenta ink and yellow ink.

14. The method of printing of claim 1, wherein the ink jet printer uses a first color ink, a second color ink, a third color ink and a black ink;

said providing step comprising providing print image data indicating one of a presence and an absence of the first color ink, the second color ink, the third color ink and the black ink at said plurality of pixel locations; and said determining step comprising determining if said subset of said print image data indicates at least one of:

a presence of at least one of the first color ink, the second color ink and the third color ink within said subset and a presence of the black ink within said subset;

a presence of at least two of the first color ink, the second color ink and the third color ink within said subset at a same corresponding pixel location; and a presence of at least one of the first color ink, the second color ink and the third color ink within said subset at a number of corresponding pixel locations exceeding said threshold value.

15. A method of printing on a print medium with an ink jet printer using a first color ink and a second color ink, said method comprising the steps of:

defining an image area on the print medium having a plurality of pixel locations;

providing print image data indicating one of a presence and an absence of the first color ink and a second color ink at said plurality of pixel locations;

defining a subset of said print image data;

determining if said subset of said print image data indicates at least one of:

a presence of each of the first color ink and the second color ink within said subset at a same corresponding pixel location; and a presence of at least one of the first color ink and the second color ink within said subset at a number of corresponding pixel locations exceeding a threshold value; and printing on the print medium in said image area at an interlace level which is dependent upon said determining step.

16. The method of printing of claim 15, wherein said providing step comprises providing print image data indicating one of a presence and an absence of the first color ink, the second color ink and a black ink at said plurality of pixel locations, and wherein said determining step comprises further determining if said subset of said print image data indicates a presence of one of the first color ink and the second color ink within said subset and a presence of the black ink within said subset.

17. The method of printing of claim 15, wherein said image area includes a plurality of rows of pixels, said plurality of rows being adjacent to each other in an advance direction of the print medium and extending across the print medium in a transverse direction, and comprising the further step of subdividing said image area into a plurality of adjacent bands of said rows of pixels.

18. The method of printing of claim 17, wherein said subset of print image data corresponds to pixel locations within one of said bands.

19. The method of printing of claim 18, wherein said subset of print image data corresponds to pixel locations within one of said rows within said one band.

20. A method of printing on a print medium with an ink jet printer using a first color ink, a second color ink and a black ink, said method comprising the steps of:

defining an image area on the print medium having a plurality of rows of pixel locations, said plurality of rows being adjacent to each other in an advance direction of the print medium and extending across the print medium in a transverse direction;

subdividing said image area into a plurality of adjacent bands, each said band including a plurality of said rows of pixels;

providing print image data indicating one of a presence and an absence of the first color ink, the second color ink and the black ink at corresponding said pixel locations within one of said bands;

defining a subset of said print image data corresponding to pixel locations within said one band;

determining if said subset of said print image data indicates at least one of:

a presence of the first color ink and the second color ink within said subset at a same corresponding pixel location and a presence of the black ink within said subset using the equation:

$$R=(C|M|Y)\&\&K;$$

a presence of each of the first color ink and the second color ink within said subset at a same corresponding pixel location using the equation:

$R=(C\&M)\|(M\&Y)\|(C\&Y)$; and a presence of at least one of the first color ink and the second color ink within said subset at a number of corresponding pixel locations exceeding a threshold value; and printing on the print medium in said image area at an interlace level which is dependent upon said determining step;

where:

C=a presence of cyan ink within said subset of image data at corresponding said pixel locations;

M=a presence of magenta ink within said subset of image data at corresponding said pixel locations;

Y=a presence of yellow ink within said subset of image data at corresponding said pixel locations;

K=a presence of black ink within said subset of image data at corresponding said pixel locations; and R=a metric variable.

21. The method of printing of claim 20, wherein said subset of print image data corresponds to pixel locations within one of said rows within said one band.

22. The method of printing of claim 21, wherein said subset of print image data corresponds to pixel locations which are adjacent to each other in the transverse direction within said one row.

23. The method of printing of claim 22, wherein said subset of print image data comprises one of an 8 bit byte and a 16 bit word.

24. The method of printing of claim 23, wherein said print image data comprises bit image data.

* * * * *

UNITED STATES PATENT AND TRADEMARK OFFICE
CERTIFICATE OF CORRECTION

PATENT NO : 5,999,705
DATED : December 7, 1999
INVENTOR(S) : John Booth Bates et al.

It is certified that error appears in the above-identified patent and that said Letters Patent is hereby corrected as shown below:

Col. 5, line 49
  replace "locations;"
  with --locations; and--.

Col. 5, lines 50-51
  please delete lines 50-51.

Claim 9, lines 13-14
  please delete "K = a presence of black ink within said subset of image data at corresponding said pixel locations;"

Signed and Sealed this

Eighteenth Day of July, 2000

Attest:

Q. TODD DICKINSON

*Attesting Officer*          *Director of Patents and Trademarks*